Patented Oct. 2, 1945

2,386,081

UNITED STATES PATENT OFFICE 2,386,081

RECOVERY OF METAL VALUES

Raymond C. Archibald, Berkeley, and Robert A. Trimble, El Cerrito, Calif., assignors to Shell Development Company, San Francisco, Calif., a corporation of Delaware No Drawing. Application November 4, 1943, Serial No. 508,998

12 Claims. (Cl. 23—140)

The present invention relates to a process for the recovery of metal values from materials containing the same and more particularly to the recovery of oxides of metals of the left sub-group of group VI of the periodic table according to Mendeleeff in an aqueous ammonia soluble form.

In the utilization of metals of the left sub-group of group VI of the periodic table, namely chromium, molybdenum, tungsten and uranium, it is often desirable to obtain the same in the form of an ammonia soluble oxide. This is particularly true in the case of tungsten, which is commonly employed as a dehydrogenation or hydrogenation catalyst in combination with nickel and sulfur, the catalyst being prepared by dissolving soluble tungstic acid in ammonium hydroxide and converting the same to ammonium thiotungstate by reaction with hydrogen sulfide. A nickel solution is prepared by dissolving nickel nitrate hexahydrate in water. The two solutions are mixed and a nickel sulfide precipitate is obtained. Sulfuric acid is then added in sufficient quantities to precipitate tungsten sulfide. The mixed sulfides are separated from the solution and roasted in a partially reducing atmosphere, a catalyst thus being obtained which may contain, in a preferred example, 1 mol of tungsten, 2 mols of nickel and 3⅓ mols of sulfur. For various reasons it has been found particularly desirable to employ aqueous ammonia solutions in the manner described above for preparing the tungsten sulfide.

The metals of the left sub-group of group VI normally occur in ores as oxides or sulfur compounds and a calcining step is generally included in processes for their recovery. The term "oxide" as used herein should be construed to include the various oxides of the metal, their hydrated forms and forms in which they are combined with water, such as tungstic acid ($H_2WO_4$) and the metal hydroxides. It is well known, however, that tungsten oxide recovered from ore by calcining is substantially insoluble in ammonium hydroxide (see for example "Handbuch der anorganischen Chemie," by Gmelin, 8th edition, 1933, volume on Wolfram, page 120). U. S. Patent 2,157,332 discloses the preparation of ammonia soluble tungsten trioxide by prolonged heating and oxidation of tungsten sulfide derived from spent catalyst.

It is an object of the present invention to provide a method for producing ammonia soluble oxides of metals of the left sub-group of the 6th group of the periodic table without the necessity of prolonged heating and oxidation. A further object of the invention is to provide a method particularly suitable for the recovery of ammonia soluble tungsten compounds from ammonia insoluble tungsten oxides and sulfides. A still further object is to provide a method for the reconstitution of catalysts containing tungsten oxides and sulfides in an ammonia insoluble form. Other objects, together with some of the advantages to be derived from operating according to the present invention, will become apparent from the following detailed description thereof.

It has now been found that ammonia soluble oxides of metals of the 6th group of the periodic table, left sub-group, may be prepared by controlled sulfiding of these metals followed by controlled wet oxidation thereof.

For purposes of illustration the process will be described in its application to the preparation of ammonia soluble tungsten oxide from tungsten trioxide, which has been prepared by calcining and is substantially insoluble in aqueous ammonia. The tungsten trioxide is first converted to tungsten sulfide by reaction with hydrogen sulfide at a temperature between approximately 200° C. and 700° C., preferably between 400° C. 500° C. The tungsten sulfide is then subjected to wet oxidation, i. e. oxidation with a strong oxidizing agent in aqueous solution, such as for example aqueous solutions of chlorates, perchlorates, chromates, dichromates, permanganates, nitric acid, etc., or by treating with hydrogen peroxide or tertiary butyl hydroperoxide, or by passing a stream of ozone through an aqueous suspension of the sulfide. The optimum conditions for this reaction will of course vary with the particular oxidizing agent employed. When using nitric acid, for example, the reaction is carried out at a temperature between approximately 50° C. and approximately 100° C., preferably between about 75° C. and 95° C. The oxidation step may be advantageously carried out by suspending the tungsten sulfide in a small quantity of dilute nitric acid, preferably having a weight concentration between about 5.0% and 20% $HNO_3$, the suspended mixture heated to 80° C.–90° C., and nitric acid added slowly while agitating the mixture. The particular concentration of acid to be used will vary somewhat with the conditions under which the process is operated. For example, if the aqueous vapors evolved from the reaction mixture are continuously withdrawn from the system, acid having a concentration of the order of 55% by weight $HNO_3$ is preferably employed, although care should be taken when operating in this manner to avoid loss of water to the point whereat the reaction mixture solidifies. On the other hand, if the aqueous vapors are condensed and the condensate returned to the reactor, the danger of solidification is substantially obviated but a stronger acid, preferably of the order of 70% by weight $HNO_3$, should be employed. A stream of air, sufficient to maintain an atmosphere of $NO_2$ fumes above the mixture, the purpose of which will be explained below, may also be advantageously employed, the air being introduced beneath the liquid level of the reactants.

Tungsten acid oxide ($H_2WO_4$) is obtained as a precipitate after completion of the oxidation. After filtration, washing and drying, a tungsten oxide which is more than 90% by weight soluble in warm, dilute, aqueous ammonia is obtained. The drying step should be carried out at a temperature not substantially exceeding 170° C., as when temperatures higher than this are employed, the tungsten oxide is reconverted to an ammonia insoluble form.

Passing air through the tungsten sulfide suspension during the oxidation step is advantageous from the standpoint of process efficiency as the oxidation reaction results in the evolution of nitric oxide which is oxidized by the air stream to nitrogen dioxide, which in turn reacts with the water present to regenerate nitric acid, thus materially reducing the acid requirement for the oxidation step.

The process as outlined above is particularly suitable for recovering ammonia soluble tungsten from tungsten-containing ores, for example those in which the tungsten is in the tungstite ($WO_3$) form. The ore is first ground to approximately 120 mesh and then sulfided with hydrogen sulfide at approximately 500° C. Wet oxidation with nitric acid of approximately 55% by weight concentration at a temperature of approximately 80° C. is then carried out, resulting in the formation of substantially water insoluble tungsten acid oxide which may be filtered from the acid solution. Acid soluble impurities, such as iron and manganese, are removed with the acid filtrate. The filter cake is then digested with dilute aqueous ammonia to form an ammonium tungstate solution, the remaining insoluble impurities being removed from the tungstate solution by a second filtration.

When tungsten-containing catalysts, such as the tungsten-nickel-sulfide catalyst described hereinbefore, have been employed in effecting dehydrogenation or hydrogenation reactions for a period of time, their catalytic activity becomes diminished. A temporary reactivation of the catalyst may be effected by treatment with sulfur dioxide, but after a number of such reactivations it has been found that the catalytic activity of the catalyst has declined below the point at which its further use is attractive. At this point it becomes necessary to reconstitute the catalyst, i. e. recover the component values thereof and rework the same to produce the equivalent of fresh catalyst. It appears that the principal reason for continued deactivation of the catalyst in spite of reactivation treatments is the gradual building up of carbon deposits on the catalyst particles, the carbon, in contrast to tars and coke, being substantially unaffected by the sulfur dioxide reactivation treatment.

The present invention lends itself particularly to the reconstitution of such spent tungsten-containing catalysts.

If the spent catalyst does not already contain a substantial quantity of its tungsten content in the form of tungsten-sulfide, it may be calcined at a temperature within the approximate range of 600° C. to 700° C. to remove the carbon content as oxides of carbon, and then sulfided as previously described. However, in the case of spent tungsten-nickel sulfide catalysts, for example, a large portion of the tungsten is already in the sulfide form, in which instance the sulfiding treatment may be omitted and the wet oxidation step employed directly to recover the ammonia soluble tungsten.

The following will serve to illustrate typical procedure in reconstituting a spent nickel-tungsten-sulfide catalyst: 200 grams of spent catalyst ground to pass a 120 mesh screen is added to a reactor containing 100 cc. of 15% by weight nitric acid solution at room temperature. The use of dilute acid for an agent in which to suspend the catalyst is preferred largely because of its wetting properties, the catalyst particles tending to agglomerate when suspended in water. A fine state of subdivision of the spent catalyst appears to be desirable because with the concentration of acid preferably used there is not a complete disintegration of larger particles within a reasonable period of time. When a 6 to 10 mesh sample of catalyst was treated, for example, the residue contained some incompletely reacted particles and the yields were appreciably lower. The heat of reaction between the dilute acid and suspended catalyst particles is usually sufficient to raise the temperature of the reactor contents to approximately 60° C. Further external heating is then applied to raise the temperature to 80° C. the mixture is constantly agitated and a stream of air is passed through the mixture at a rapid bubbling rate. Nitric acid having a concentration of 55% by weight is then added dropwise to the reactor at a rate suitable for maintaining a temperature of 80° C. in the reactor. The oxidation reaction is completed after addition of 3.84 moles of nitric acid in a 55% by weight concentration over a period of 5 to 6 hours.

It may be added that the air stream not only serves to regenerate nitric acid as mentioned before, but also to control foaming within the reactor and aids in evaporating water from the reaction mixture in order to maintain higher acid concentrations.

The reaction mixture is then removed from the reactor and diluted with sufficient water to prevent crystallization of nickel sulfate during the filtration step from which is obtained a solution containing substantially all of the nickel originally present in the catalyst and a filter cake containing substantially all of the tungsten originally present in the catalyst, as well as the carbon and a substantial amount of the sulfur. This filter cake is washed with dilute nitric acid to remove small quantities of nickel which may be retained therein.

The filter cake is then digested in 400 cc. of an aqueous solution containing 14% by weight of ammonia for 1 hour, heating slowly to 50° C. 200 cc. of water is then added, the mixture filtered and the filter cake washed with dilute ammonium hydroxide. The ammonium tungstate solution thus prepared contained 92.3% by weight of the total tungsten contained in the spent catalyst. A more complete recovery of tungsten may be attained, if desired, by calcining the filter cake obtained after the ammonia digestion in order to remove the carbon and produce an ammonia insoluble tungsten oxide which may then be sulfided with hydrogen sulfide as described hereinbefore and the tungsten sulfide obtained treated in the manner described above in relation to the recovery of tungsten from spent catalysts containing tungsten sulfide.

We claim as our invention:

1. In a method for producing a compound of a metal from the left sub-group of group VI of the periodic table in an ammonia soluble form, the steps comprising subjecting a sulfide of said metal, prepared from hydrogen sulfide and a compound of said metal, to wet oxidation to produce a substantially water insoluble, ammonia soluble oxide precipitate of said metal and recovering said metal oxide precipitate.

2. In a method for producing a compound of a metal from the left sub-group of group VI of the periodic table in an ammonia soluble form, the steps comprising reacting an ammonia insoluble compound of said metal with hydrogen sulfide to form a sulfide of said metal, subjecting said metal sulfide to wet oxidation to produce a substantially water insoluble, ammonia soluble oxide precipitate of said metal and recovering said metal oxide precipitate.

3. In a method for producing tungsten oxide in an ammonia soluble form, the steps comprising subjecting tungsten sulfide, prepared from hydrogen sulfide and a tungsten compound, to wet oxidation to produce a substantially water insoluble, ammonia soluble tungsten oxide precipitate and recovering said tungsten oxide precipitate.

4. In a method for producing tungsten oxide in an ammonia soluble form the steps comprising reacting an ammonia insoluble tungsten compound with hydrogen sulfide to produce tungsten sulfide, subjecting said tungsten sulfide to wet oxidation to produce a substantially water insoluble, ammonia soluble tungsten oxide and recovering said ammonia soluble tungsten oxide.

5. In a method for producing tungsten oxide in an ammonia soluble form the steps comprising subjecting tungsten sulfide, prepared from hydrogen sulfide and a tungsten compound, to wet oxidation with nitric acid to produce a substantially water insoluble, ammonia soluble tungsten oxide and recovering said ammonia soluble tungsten oxide.

6. In a method for producing tungsten oxide in an ammonia soluble form the step comprising subjecting tungsten sulfide, prepared from hydrogen sulfide and a tungsten compound, to wet oxidation with nitric acid at a temperature within the approximate range of 50° C. to 100° C. to produce a substantially water insoluble, ammonia soluble tungsten oxide and recovering said ammonia soluble tungsten oxide.

7. In a method for producing tungsten oxide in an ammonia soluble form the steps comprising subjecting tungsten sulfide, prepared from hydrogen sulfide and a tungsten compound, to wet oxidation with an oxidizing agent comprising an aqueous solution containing at least approximately 50% by weight of nitric acid at a temperature within the approximate range of 50° C. to 100° C. to produce a substantially water insoluble, ammonia soluble tungsten oxide and separating said ammonia soluble tungsten oxide from said oxidizing agent.

8. In a method for producing tungsten oxide in an ammonia soluble form the steps comprising reacting an ammonia insoluble tungsten compound with hydrogen sulfide at a temperature within the approximate range of 200° C. to 700° C. to produce tungsten sulfide, subjecting said tungsten sulfide to wet oxidation with an oxidizing agent comprising an aqueous solution containing at least approximately 50% by weight of nitric acid at a temperature within the approximate range of 50° C. to 100° C. to produce a substantially water insoluble, ammonia soluble tungsten oxide and separating said ammonia soluble tungsten oxide from said oxiding agent.

9. In a method for producing tungsten oxide in an ammonia soluble form the steps comprising reacting an ammonia insoluble tungsten compound with hydrogen sulfide at a temperature within the approximate range of 400° C. to 500° C. to produce tungsten sulfide, subjecting said tungsten sulfide to wet oxidation with an oxidizing agent comprising an aqueous solution containing approximately 70% by weight of nitric acid at a temperature within the approximate range of 75° C. to 95° C. to produce a substantially water insoluble, ammonia soluble tungsten oxide and separating said ammonia soluble tungsten oxide from said oxidizing agent.

10. In a method for producing tungsten oxide in an ammonia soluble form the steps comprising reacting finely divided tungsten sulfide, prepared from hydrogen sulfide and a tungsten compound, with a wet oxidation agent, said oxidation agent comprising an aqueous solution containing at least approximately 50% by weight of nitric acid, maintaining the temperature during the oxidation reaction within the approximate range of 50° C. to 100° C., continuously passing an oxygen containing gas stream through said nitric acid solution during the oxidation reaction and separating ammonia soluble tungsten oxide from said oxidation agent.

11. In a method for recovering tungsten oxide in an ammonia soluble form from a spent tungsten sulfide containing catalyst the steps comprising subjecting finely divided tungsten sulfide containing catalyst, the tungsten sulfide of which was prepared from hydrogen sulfide and a tungsten compound, to the action of an oxidizing agent comprising an aqueous solution containing at least approximately 50% by weight of nitric acid, maintaining the temperature of said nitric acid solution within the approximate range of 50° C. to 100° C., continuously passing an oxygen containing gas stream through said nitric acid solution, filtering said nitric acid solution to obtain an ammonia soluble tungsten oxide and digesting said recovered tungsten oxide in aqueous ammonia.

12. In a method for recovering tungsten oxide in an ammonia soluble form from a spent tungsten sulfide containing catalyst the steps comprising subjecting finely divided tungsten sulfide containing catalyst, the tungsten sulfide of which was prepared from hydrogen sulfide and a tungsten compound, to the action of an oxidizing agent comprising an aqueous solution containing approximately 55% by weight of nitric acid at a temperature within the approximate range of 75° C. to 95° C. to form a tungsten oxide precipitate substantially insoluble in said nitric acid solution, continuously passing an oxygen containing gas stream through said nitric acid solution, filtering said insoluble tungsten oxide from said nitric acid solution and digesting said tungsten oxide in aqueous ammonia.

RAYMOND C. ARCHIBALD.
ROBERT A. TRIMBLE.